United States Patent [19]

Montgomery et al.

[11] Patent Number: 5,774,530
[45] Date of Patent: Jun. 30, 1998

[54] TELECOMMUNICATIONS NETWORK CIRCUIT USAGE MEASUREMENT

[75] Inventors: Robert H. Montgomery, Herndon; J. Alfred Baird, Fairfax, both of Va.

[73] Assignee: Bell Atlantic Network Services, Inc., Arlington, Va.

[21] Appl. No.: 598,869

[22] Filed: Feb. 9, 1996

Related U.S. Application Data

[63] Continuation-in-part of Ser. No. 598,772, Feb. 9, 1996.

[51] Int. Cl.⁶ .................................................. H04M 15/00
[52] U.S. Cl. ........................... 379/112; 379/34; 379/114; 379/122; 379/207
[58] Field of Search ............................. 379/34, 112–115, 379/122, 207, 209

[56] References Cited

U.S. PATENT DOCUMENTS

| | | |
|---|---|---|
| 4,381,522 | 4/1983 | Lambert . |
| 4,506,387 | 3/1985 | Walter . |
| 4,888,638 | 12/1989 | Bohn . |
| 4,890,320 | 12/1989 | Monslow et al. . |
| 4,893,248 | 1/1990 | Pitts et al. . |
| 4,949,187 | 8/1990 | Cohen . |
| 4,963,995 | 10/1990 | Lang . |
| 4,995,078 | 2/1991 | Monslow et al. . |
| 5,027,400 | 6/1991 | Baji et al. . |
| 5,057,932 | 10/1991 | Lang . |
| 5,130,792 | 7/1992 | Tindell et al. . |
| 5,132,992 | 7/1992 | Yurt et al. . |
| 5,133,079 | 7/1992 | Ballantyne et al. . |
| 5,200,993 | 4/1993 | Wheeler . |
| 5,247,347 | 9/1993 | Litteral et al. . |
| 5,247,571 | 9/1993 | Kay et al. . |
| 5,253,275 | 10/1993 | Yurt et al. . |
| 5,377,186 | 12/1994 | Wegner et al. . |
| 5,410,343 | 4/1995 | Coddington et al. . |
| 5,592,477 | 1/1997 | Farris et al. .............................. 379/207 |
| 5,592,530 | 1/1997 | Brockman et al. ....................... 379/34 |
| 5,594,789 | 1/1997 | Seazholtz et al. ....................... 379/207 |

OTHER PUBLICATIONS

Brian Oliver et al, U.S. Patent Application Serial No. 08/405,685, filed Mar. 17, 1995.

*Primary Examiner*—Curtis Kuntz
*Assistant Examiner*—Duc Nguyen
*Attorney, Agent, or Firm*—McDermott, Will & Emery

[57] ABSTRACT

A system and method is provided for using underused or unused local telephone company local loops to subscriber premises for providing to such premises a connection to an alternate service provider. The use of the local loop is leased to the ultimate service provider at a rate dependent upon the usage and nature of usage of the circuit. Information and data to permit efficient and convenient billing for leased usage of the loops is implemented by providing on the local loop a passive monitor. The monitors are connected with a signal switching point (SSP) and deliver a dialed number. The dialed number contains information regarding the commencement or termination of the usage of an identified local loop and an identification of the nature of such usage. This dialed number triggers the SSP to formulate a message containing the information and forward the same to a service control point (SCP). The SCP contains a database for storing and processing the information. The usage information is periodically downloaded to a billing office for billing to the alternate service provider and/or customer.

27 Claims, 12 Drawing Sheets

TELECOMMUNICATIONS NETWORK CIRCUIT USAGE MEASUREMENT

RELATED APPLICATIONS

This application is a continuation-in-part of application Ser. No. 08/598,772, filed Feb. 9, 1996.

FIELD OF INVENTION

This invention relates to the measurement of usage of specific portions of links in a telecommunications network and, more particularly, to a system and method for monitoring, detecting and measuring third party usage of predetermined links in a telecommunication network.

BACKGROUND ART

In the current communications environment multiple types of communication services and/or broadcasts are being provided to communication service customers over varying types of delivery links provided by different service providers. Telecommunications services are being provided to residences and businesses via the conventional loop and trunk circuits over which both voice and data are transmitted. At the present time the data transmissions over these circuits include facsimile, packet, imaging, and video content.

U.S. Pat. No. 5,200,993, issued Apr. 6, 1993, to Wheeler et al., describes a public telephone network which includes enhanced capabilities with a distributed imaging system. The distributed imaging system provides centralized image processing to end users and access to a range of image management capabilities residing on a shared platform distributed through a switched telephone system. The shared platform functions as a service bureau in delivering such capabilities to end users.

The distributed imaging system embodies an image platform based on the client-server model with standard communications interfaces to service multiple separate user groups accessing different applications. User groups can supply applications programs which are stored and run on the central hardware in support of respective user requirements. The image server operations are provided as functional primitives. User applications are provided by combining the primitives in a control script.

U.S. Pat. No. 5,247,347, issued Sep. 21, 1993, to Litteral et al., describes a public switched telephone network architecture for providing video-on-demand services. A subscriber uses either a standard telephone instrument over the public switched telephone network or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse transmission channel from the subscriber to the central office for transmission on the ISDN packet data network back to the video information provider. The interfaces also allow baseband signaling and audio between the central office and the subscriber for conventional telephone instrument connectivity.

U.S. Pat. No. 5,410,343, issued Apr. 25, 1995, to Coddington, et al., describes video-on-demand services using the public switched telephone network. In this system a central office based public switched telephone network is used for supplying video information from a digital information storage medium to designated subscriber premises. The system utilizes subscriber loop transmission means for transferring (1) selected video information from a central office to the subscriber premises, (2) subscriber order data from the subscriber premises to the central office location, and (3) telephone service signals between the subscriber premises and the central office.

A switch at the central office receives the subscriber order data from the subscriber loop transmission means. A video gateway in turn is responsive to the subscriber order data from the switch for producing video routing data. A file server, responsive to requests received from the video gateway, obtains selected video information from the digital information storage medium. A cross-connect switch in turn is responsive to the video routing data for transmitting the video information from the file server to the subscriber loop transmission means. Asymmetrical digital subscriber line interface (ADSL) units over a local loop carry the necessary signaling between the subscribers and information providers. The interface units frequency multiplex digital video information with voice information to the subscriber and support transmission of a reverse control channel from the subscriber to the central office for transmission back to the information provider.

U.S. Pat. Nos. 4,890,320 and 4,995,078, issued Dec. 26, 1989, and Feb. 19, 1991, respectively, to Monslow et al., describe programming-on-demand and impulse pay-per-view delivery systems that utilize at least in part the public switched telephone network. These patents disclose a television broadcast system for real-time transmission of a viewer chosen program at a viewer requested time for the requesting viewer's television receiver. The system comprises a program collection, which stores TV programs on a video tape. Each program is assigned and labeled with a catalog number. A viewer request is transmitted using a conventional telephone over the public switched telephone network to a scheduling computer. The chosen program is transmitted at the requested time over a broadband cable for viewing on the requesting viewer's television receiver. A control unit prevents other households connected to the cable from viewing the program.

U.S. Pat. No. 4,949,187, issued Aug. 14, 1990, to Cohen describes a video communications system comprising a remotely controlled central source of video and audio data. This system allows home viewers to select from a choice of movies or other video and audio data that may be transmitted from the central source to be stored at the viewer's premises. The viewer can play the selection at any convenient time of his choosing. The central source may store the data digitally. Movies that need to be frequently accessed are stored on disks. Movies that are accessed only infrequently are archived. A distribution system CPU controls the bi-directional flow of data from both types of drives. Several movies can be transmitted simultaneously to different viewers through a plurality of input/output controllers. To make use of a single transmission media, such as a telephone line, a multiplexer is used which may multiplex in the time domain or the frequency domain.

U.S. Pat. No. 4,381,522, issued Apr. 26, 1983, to Lambert, discloses a cable television system which includes a plurality of selectable video signal sources having suitable television program material. The system enables a viewer to select desired program material available by telephone at a remote location and have the selected material promptly available for viewing.

U.S. Pat. No. 4,888,638 issued Dec. 19, 1989, to Bohn, discloses a marketing research system for substituting stored TV programs for regularly scheduled, broadcast TV programs. The substitute TV programs may be transmitted from a central office via telephone lines to households of cooperating panelists for storage at the household premises.

More recently, several different wideband digital distribution networks have been proposed for offering subscribers an array of video services, including true video-on-demand service. The following U.S. patents disclose representative examples of such digital video distribution networks: U.S. Pat. Nos. 5,253,275 to Yurt et al.; 5,132,992 to Yurt et al.; 5,133,079 to Ballantyne et al.; 5,130,792 to Tindell et al.; 5,057,932 to Lang; 4,963,995 to Lang; 4,949,187 to Cohen; 5,027,400 to Baji et al. and 4,506,387 to Walter.

A high percentage of television service to residential customers is now provided by coaxial cable delivery networks (CATV). CATV provides broad bandwidth and it is the expressed intention of cable television operators to provide local telephone service over their existing cables. At the same time, wireless or radio links are providing co-called wireless cable TV, as well as satellite delivery of television and data communication signals. In addition, the interexchange or long distance telephone carriers have expressed an intent to supply local connectivity for their interexchange services, thereby eliminating their need to connect through local exchange carriers and their local loop.

In this competitive context it would seem probable that at least some existing local exchange carrier (LEC) local loops may become unused or under used. As a consequence it would be desirable and advantageous to LEC's to provide an alternate usage for such links and an effective and economical method for measuring usage for billing purposes. It is accordingly an object of the present invention to provide an arrangement and method for utilizing portions of the existing public switched telephone network for alternate purposes, while efficiently and conveniently providing a method of measuring the usage of such circuits for billing purposes.

DISCLOSURE OF THE INVENTION

According to the invention there is provided an arrangement wherein one or more telephone company local loops to subscriber premises may be utilized in whole or in part for providing to such premises a connection to the service platform of a third party alternate service provider. The alternate service provider may be another local telephone company, an interexchange carrier, a video service provider, a multi-media service provider, or the like. The use of the local loop is leased to the third party service provider at a rate dependent upon the usage and nature of usage of the circuit.

Information and data to permit efficient and convenient billing for leased usage of such loops is implemented by providing on the local loop a passive monitor. The monitor detects and temporarily stores data relating to the commencement and termination of signaling, the time of day, and the nature of the signaling that occurs. Thus, charges may be dependent not only upon the time duration of signaling, but also on the rate of information transferred.

Data collected from the monitors is stored at a monitor center from which it is transferred to a billing operation such as the telephone company Revenue Accounting Office (RAO). In the process of transfer of the information to the RAO it may be expedient to store the information in a convenient switch journal for transfer to the RAO over existing switch journal to RAO links.

The data may be transferred from the monitors to the central storage through varying known procedures. The monitors are provided with identifying indicia, such as numbers, and are preferably provided with a buffer memory for temporarily storing data. The central storage includes a processor and can periodically sweep or scan the monitors to collect the data. Alternatively the monitors, which also include a microprocessor and clock, may periodically transmit or download their identification and data to the monitor center storage. As a still further alternative the monitors may download data on a real time basis. According to one feature of the invention the data may be collected from the monitors through the use of the existing LEC common channel signaling system.

It is another feature of the invention that the monitors may be implemented as a part of a monitor-switch module. This module provides the option of connecting the local loop which extends to the customer premise to either the third party service provider or to an end office telephone company switch. This permits the possibility of part-time leasing of the loop or of simultaneous loop usage by the third party service provider and the telephone company. The latter usage is possible using non-interfering signaling modes by the two parties. Control of the necessary switching may be implemented without the necessity of additional wiring by using non-interfering in-band signaling.

It is another feature of the invention that the link between the monitors and the monitor center for providing the monitor data to the monitor center may take multiple forms. According to one preferred embodiment of the invention, where a local loop is broken or disconnected remote from the end office or monitor center, the link to the monitor center may be provided by using that portion of the disconnected loop which formerly was connected to the switch for serving the telephone terminal in the customer premise. The other portion of the disconnected loop which extends to the customer premise is then connected to the alternate service provider's line to the service platform of such provider. The monitor is coupled to the loop at this location and the data connection of the monitor to the monitor center is made via the portion of the former local loop extending to the end office. As an alternative, separate links may be provided to connect the monitors to the monitor control center. As a still additional alternative, wireless or radio links may be utilized between the monitors and the monitor control center.

According to another embodiment of the invention the capabilities of the common channel signaling system and an Advanced Intelligent Network (AIN) are utilized in the information handling. In this version the monitors communicate with a Signal Switching Point (SSP) by delivering to such SSP a dialed number. The dialed number contains information regarding the commencement or termination of the usage of an identified local loop and an identification of the nature of such usage. This dialed number triggers the SSP to formulate a message which may preferably utilize the protocol known as Transaction Capabilities Application Part (TCAP) which contains the information delivered to the SSP by the dialing. The SSP sends this TCAP message via one or more Signal Transfer Points (STPs) to a Service Control Point (SCP). The SCP contains the usual database of enhanced subscriber services which are accessed and controlled by a Service Logic Program (SLP). In this particular embodiment the SCP also contains a database for storing and processing the information handled in the monitor control center of the preceding embodiments of the invention. The SCP gathers and stores the usage information and periodically downloads such information to a billing office such as the Records Accounting Office (RAO) for billing to the alternate service provider and/or customer as may be arranged between the contracting parties.

BRIEF DESCRIPTION OF DRAWINGS

The invention will be understood and its numerous objects and advantages will become more apparent to those skilled in the art by reference to the following drawings, in conjunction with the accompanying specification, in which.

BEST MODE FOR CARRYING OUT THE INVENTION

Figure 1:
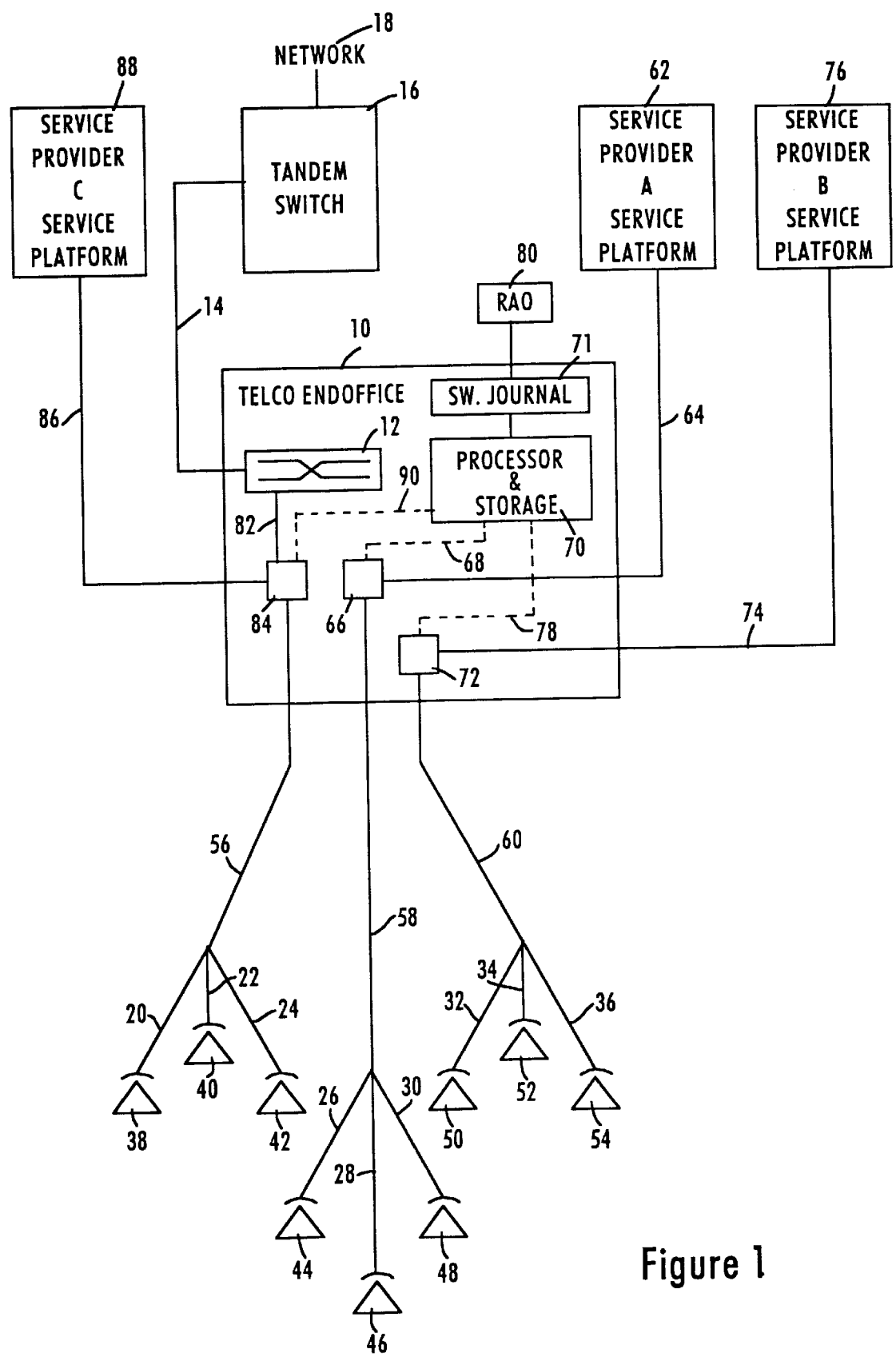
FIG. 1 is a simplified block diagram illustrating an arrangement to provide leased access of local loops in a switched telecommunications network to third party providers including an arrangement for monitoring, measuring and billing for usage of such leased circuits.

FIG. 1 is a simplified block diagram illustrating an arrangement to provide leased access to local loops in a switched telecommunications network to third party providers. The illustrated arrangement includes a system for monitoring, measuring and billing for such usage of the leased circuits on the basis of both the amount and nature of such usage.

Referring to FIG. 1 there is shown an end office 10 of a local exchange carrier (LEC), which could be either a Regional Bell Operating Company (RBOC) or an independent telephone company which provides local telephone and related services. The LEC end office 10 typically includes a program controlled switch shown at 12. Such a switch may be a 5ESS switch manufactured by AT&T or equivalent switches available from other manufacturers. The switch 12 is connected by a suitable trunk 14 and tandem switch 16 to the telecommunications network indicated generally at 18. In its original capacity as an LEC end office switch the switch 12 provided connection to a series of local loops 20–36 connected to telephone terminals 38–54. For convenience of illustration the local loops 20, 22 and 24 are shown in the form of a cable 56 and the remaining local loops are shown as cables 58 and 60.

According to the invention the local loops 44, 46 and 48, shown cabled at 58, are leased to an alternate service provider A. Service provider A has a service platform 62 connected to the loops 44, 46 and 48 through an alternate service provider owned cable 64 to the LEC owned cable 58 which feeds the terminals 44, 46 and 48. The connection is made through a monitor 66. The connection through the monitor may be of a series nature such that the service provider signal passes through the monitor or, alternatively, the monitor may be inductively or otherwise coupled to the line carrying the service provider signal.

The monitor shown as a single element at 66 actually comprises separate monitor units for each of the local loops 26, 28 and 30 for monitoring the individual usage of those loops, as presently described in greater detail. The individual monitor units in monitor 66 are connected via a data link or links 68 to a processor and storage 70. In similar fashion the local loops 32, 34 and 36 are connected through cable 60, monitor 72 and cable 74 to yet another service provider B at that service provider's service platform 76. The monitor 72 again comprises three individual units for the separate loops 32, 34 and 36. These units are connected via a data link or links 78 to the monitor center processor and storage 70.

Local loops 26–30 and 32–36 are leased to service providers A and B for charges based on usage and nature of usage, i.e., voice band, broadband, data rate, etc. It is anticipated that the lease agreements would identify the nature of usage intended and specify use rates for the particular type of service. This would permit the usage monitors indicated at 66 and 72 to be designed for measuring the intended usage. On the other hand, more universal monitors may be utilized if this should prove advantageous.

The monitor units are connected by data links 68 and 78 to the processor and storage 70. This unit compiles a database of identified per loop cumulative usage by duration, time of day and nature of usage. For example, each monitor can mark the time of initiation of usage of its link, the time of day, the frequency, data rate, and bandwidth of use and the time of termination of that usage. The frequency, data rate and bandwidth utilized may change during usage and this is duly recorded in the processor and storage 70. The processor and storage 70 periodically formulate and transmit summary reports of link usage by customer to the switch journal 71 and from there to an appropriate billing entity such as the Revenue Accounting Office (RAO) 80. At the end of each month the records accounting office may compile and submit bills to the respective customers for their usage of the leased links.

Referring to the left-most illustrative telephone terminals 38–42 served by the LEC end office switch 12, this set of loops is shown connected to the switch 12. However, the loops may also be leased on a full or part-time basis to an alternate service provider. When the loops 20–24 are served by the LEC switch 12, the cable 56 is connected to the switch at 82. However, the cable 56 is connected to cable 82 through a combined monitor and switching module 84 described in detail hereinafter in connection with FIG. 3. The monitor in the combined module 84 provides a connection 86 to a the third alternate service provider C at that provider's service platform 88. The switch and monitor module 84 is also connected via data link 90 to the processor and storage unit 70.

This arrangement provides several options. The LEC may provide plain old telephone service (POTS) to the telephone terminals 38–42, while granting to the service provider C a lease to use the local loops 20–24 for non-conflicting or non-interfering service. Such service may be in a frequency band separated from the conventional 4,000 KHz band utilized by the voice signal. That service usage can be monitored via the monitor unit 84 and billed by the RAO as previously described. At the same time the LEC may provide its own POTS service to one or more of the terminals 38–42. It will be understood that simultaneous service by the third party alternate service provider terminates in a terminal other than the POTS or other telephone served by the LEC. Such a terminal may be a video, facsimile, printer, or the like. The monitor module 84 contains separate sub-units for the individual loops 20–24 as previously described.

Alternatively to the foregoing, service provider C may lease one or more of the loops 20–24 on an as needed basis at such times as the loop can be seized in an on-hook condition. As a still further alternative, service provider C may choose to lease the entire capacity of the loops either on a demand basis or at specified times of day. In this situation the loops are disconnected from the switch during the time of use by the alternate service provider. A central office controlled switch may be provided at or adjacent to the switch 12 for this purpose.

Figure 2:
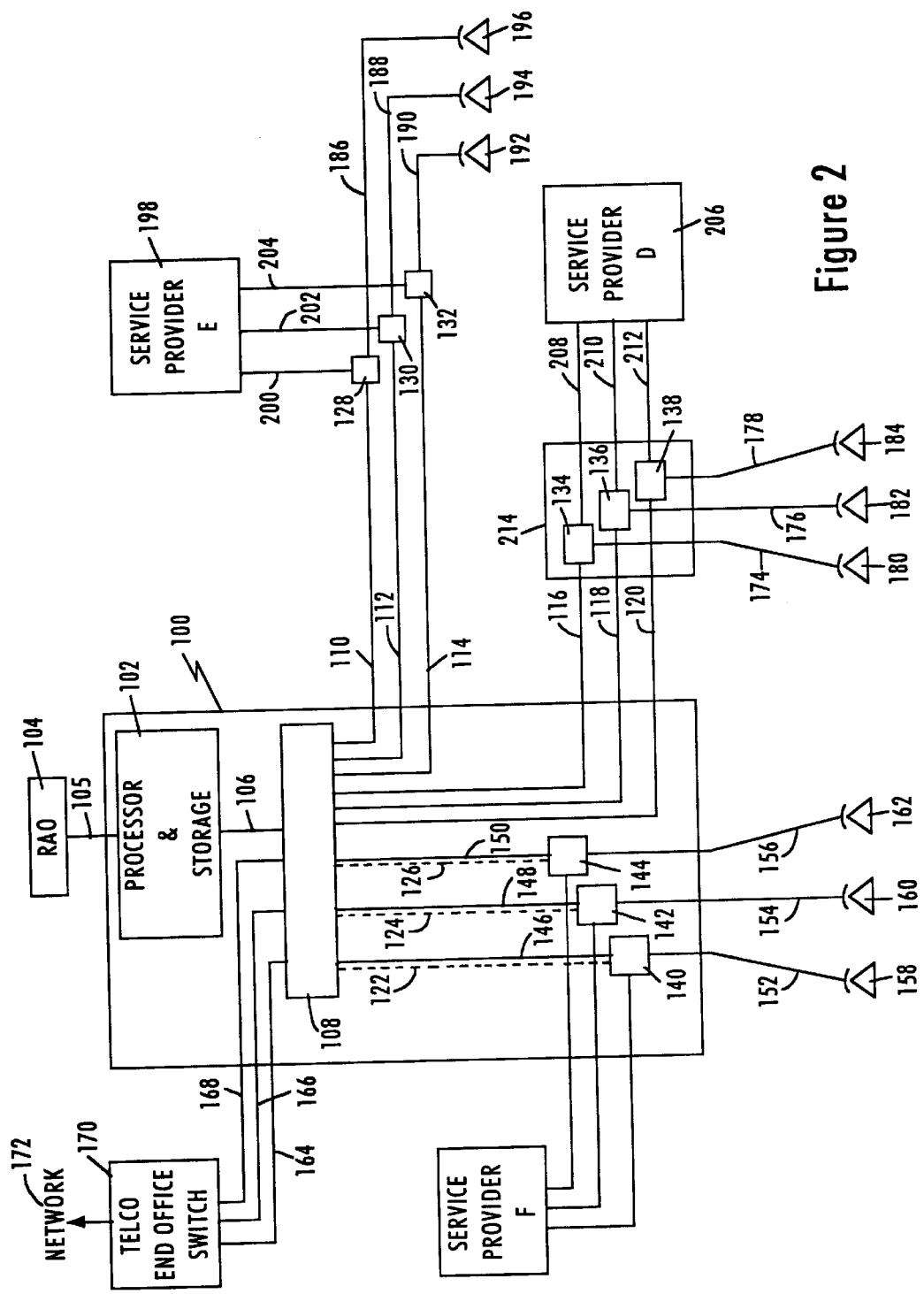
FIG. 2 is a simplified block diagram illustrating another arrangement to provide leased access of local loops in a telecommunications network to third party providers including an arrangement for monitoring, measuring and billing for usage of such leased circuits.

Referring to FIG. 2 there is shown another preferred embodiment of the invention. While the connections between the alternate service providers and the local loops are shown as being made within an LEC end office in the embodiment in FIG. 1, it is not necessary that these connections be concentrated. In FIG. 2 there is shown an embodiment of the invention wherein alternate service providers connect to their leased local loops at distributed sites. In this embodiment a monitor center 100 may be located at any convenient site. The monitor center houses the processor and storage 102 which is connected to the revenue accounting office (RAO) 104 via a suitable link 105.

Figure 3:
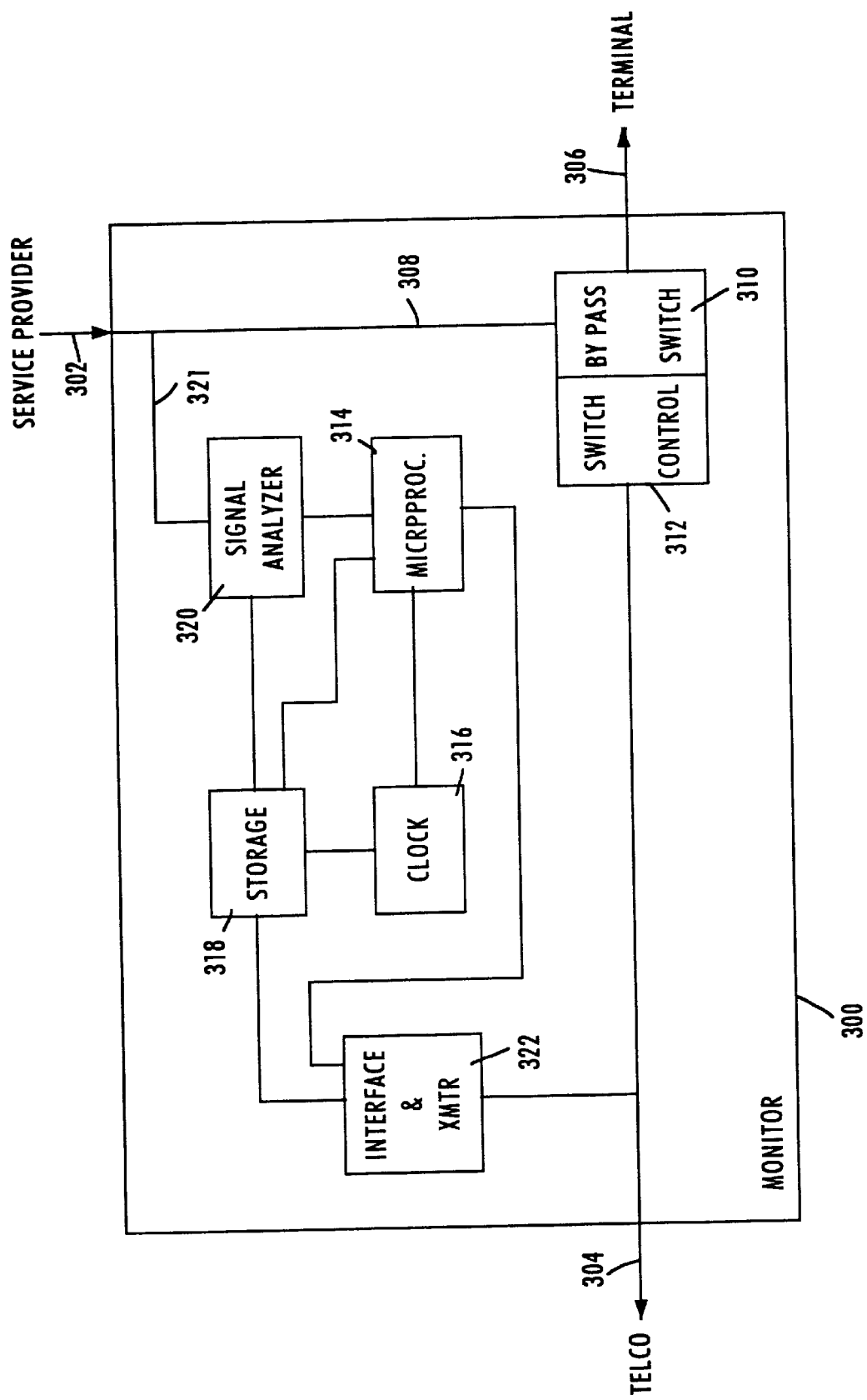
FIG. 3 is a simplified block diagram of a monitor-switch module suitable for use in the system and method of the invention.

The processor and storage 102 is connected by a data link or links 106 to a connection or distribution frame 108 for connection to the monitor leads 110–126. These monitor leads in turn are connected to outdoor mounted monitors 128–132, vault mounted monitors 132–136, and monitor center mounted monitors 140–144. The monitor center monitors 140–144 constitute the individual monitors in a monitor module such as the monitor module 84 in FIG. 1 and the module 300 illustrated in FIG. 3, presently to be described. These units perform both monitor and switching functions. Monitors 140–144 are connected to the distribution frame 108 not only by data links 122–126 shown with broken lines, but also by local loop lines shown as solid lines at 146–150. These local loop lines provide connection through the monitor-switch units 140–144 to the outdoor local loops 152–156 which terminate at telephone terminals 158–162. The local loops 152–156 are connected through the distribution frame 108 to lines 164–168 to the LEC end office switch 170. The switch 170 in turn is connected to the switched telephone network indicated generally at 172.

The second set of monitors 134–138 is not mounted in the monitor center 100 but in an externally located site 214. Monitors 134–138 connect local loops 174–178 to service provider D at 206 via lines 208–212. By way of example, the monitors 134–138 may be housed in a controlled environmental vault (CEV) 214. The monitors 134–138 are connected to the distribution frame 108 by loop lines 116–120.

The third group of monitors 128–132 is outdoor mounted and may be overhead, pedestal or otherwise mounted. The local loops 186–190 connect the premises housing telephone terminals 192–196 to alternate service provider E. The monitors 128–132 may be exterior units mounted singly or in clusters on overhead structures.

It is a feature of the invention that the monitor connections to the distribution frame 108 may be made through the use of the conductors which previously served as portions of the local loops from the end office switch serving the original telephone terminals. This is particularly applicable to the outdoor monitors 192–196 and the CEV monitors 134–138. This use of the disconnected local loop leads facilitates implementation of distributed connections to the alternate service providers and distributed monitoring. When this is done there is no need to locate or install separate monitor data collector leads from the monitors to a monitor center. The installation is facilitated in that the technician making the monitor connection needs only to break the existing local loop, connect the telephone terminal end to the alternate service provider, and connect the former switch end to the data terminals on the monitor. The monitor is either inductively coupled to the leased loop portion, inserted in series therewith, or bridged onto that portion of the local loop. The monitor center may conveniently be sited proximate an LEC network switching office for ready connection to the network.

It is possible to use these existing local loop leads which are now connected to the monitor center to serve combination monitor-switch modules such as units 140–144 by conducting the necessary switch control via in-band signaling over the loop. Such signaling may be used not only from the monitors to the processor and storage 102 but also over the connection to the alternate service providers. This permits the alternate service providers to al so maintain a running compilation of individual line usage where this is desired.

Referring to FIG. 3 there is shown a simplified block diagram of an illustrative monitor-switch module which may be used in the system of the invention. The monitor-switch module 300 is connected to its alternate service provider at 302, to the LEC end office at 304, and to the external loop and customer premise terminal at 306. The service provider connection at 302 continues in module 300 as line 308. Line 308 is connected to a bypass switch module which comprises a switch 310 and a switch control 312. The switch control and switch are also connected to the LEC line 304 which goes to the LEC switch (not shown), and to the customer terminal line 306 and to the local loop to which it is connected.

When the local loop 306 is leased by the service provider on a full time basis the switch 310 connects the terminal and loop line 306 directly to the incoming service provider line 308. The terminal and loop line 306 are then disconnected from the LEC switch line 304. If the contrary situation exists where the LEC is serving the loop and telephone terminal on a full time basis, the converse is true. The loop 306 is then directly connected to the LEC line 304 and is disconnected from the service provider lines 308 and 302.

The condition of the switch 310 may be controlled by the LEC by in band signaling to the switch control 312 over the line 304. If desired, the LEC may provide for shared usage of the loop 306 and permit the service provider 302 the ability to control the switch by similar inband signaling over the service provider line 308. A contention situation may exist at the switch 310 which may be handled by conventional busy signal protocols or a similar arrangement. The agreement between the LEC and the alternate service provider may obviously establish the conditions for solving such contention situations. The availability of this type of switching can also be used to permit the service provider access to the LEC switched network under agreed conditions.

The monitor module 300 also contains a microprocessor 314, clock 316, storage 318, signal analyzer 320, and interface and transmitter or modem 322. The microprocessor controls the signal analyzer, storage and transmitter or modem. The signal analyzer 320 is connected to the incoming service provider signal via connection 321 and provides an output which indicates the presence or absence of a service provider signal, the nature of the signal, the baud rate or rate of information transfer, and other details of the signal where desired. Such analyzers are well known in the art and in an illustrative embodiment may take the form of the analyzer manufactured by Advanced Electronic Applications, Inc. under their model number PK-232MBX.

The output of the signal analyzer 320 is periodically connected to the storage 318 under control of the microprocessor and such output is recorded along with the time of each entry. This provides in the storage 318 a database of usage which shows the time and duration of usage and the nature of the signal or signals being carried. This data is periodically transferred to the processor and storage 70 or 102 of the LEC for billing purposes as previously described in connection with FIGS. 1 and 2.

It is also a feature of the invention that billing information may be supplied directly to the service provider for purposes of the service provider billing its own customers. Such billing information may be supplied by the LEC either from the RAO via the telephone network or, as an alternative, the microprocessor in the monitor may be programmed to effect a connection from the transmitter or modem 322 to the providers line 308 through the switch 310 for transfer direct to the service provider by suitable signaling over that line. If desired by the service provider the monitor may also be arranged to monitor the identity of the channel being delivered to the subscriber over the loop. If such a feature is desired the monitor may be provided with the added feature of making such an identification in the manner shown by way of example in the monitor described in U.S. Pat. No. 4,893,248, issued Jan. 9, 1990 to Pitts et al.

Figure 4:
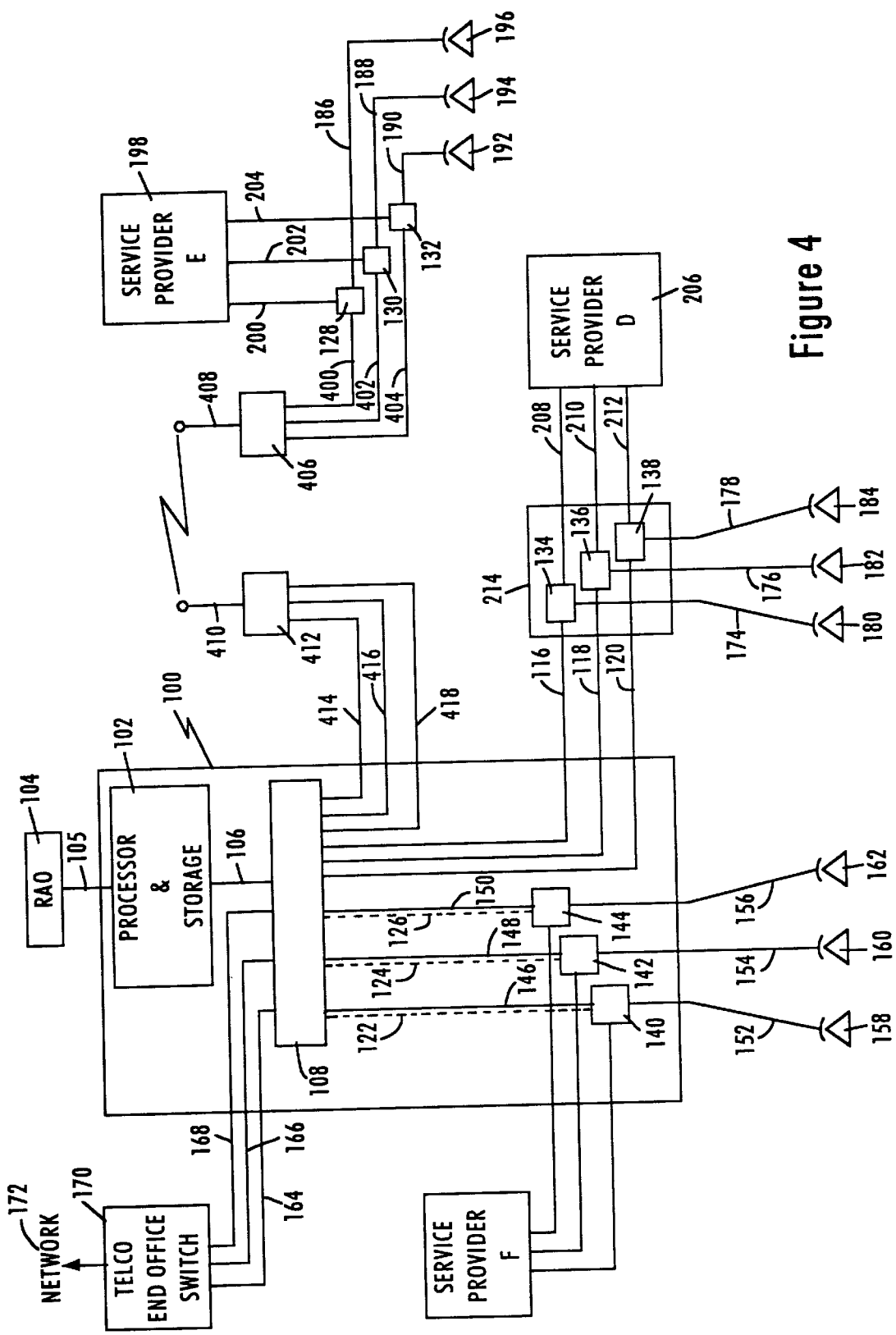
FIG. 4 is a simplified block diagram illustrating still another arrangement to provide leased access of local loops in a switched telecommunications network to third party providers including an arrangement for monitoring, measuring and billing for usage of such leased circuits.

Referring to FIG. 4 there is shown yet another embodiment of the invention wherein the link between the monitors and the monitor center is provided in a wireless fashion by a suitable radio connection. FIG. 4 shows an embodiment of the invention similar to that shown in FIG. 2 with the exception of the link provided between the monitors 128–132 for service provider E and the monitor center 100. According to this feature of the invention the data connection to the monitors 128–132 is fed via lines 400, 402 and 404 to a suitable multiplexer, modulator and transmitter 406. An antenna 408 radiates the modulated carrier, preferably at a frequency in the VHF band or above. This signal is received by a receiving antenna 410 of a receiver, demodulator and demultiplexer 412. From the unit 412 the demultiplexed signals are fed via leads 414, 416 and 418 to the distribution frame 108 and from there via the link 106 to the processor and storage 102. The transmitter, modulator, multiplexer and receiver, demodulator and demultiplexer may be of any suitable type well known to those skilled in the art and may, for example, be of the type described in detail in U.S. patent application Ser. No. 08/405,685 filed Mar. 17, 1995, and co-assigned with the present invention.

Modern telecommunications systems offer subscribers a large number of enhanced subscriber services and are increasingly implementing these services through the use of a common channel signaling system known as the Advanced Intelligent Network (AIN).

Figure 5:
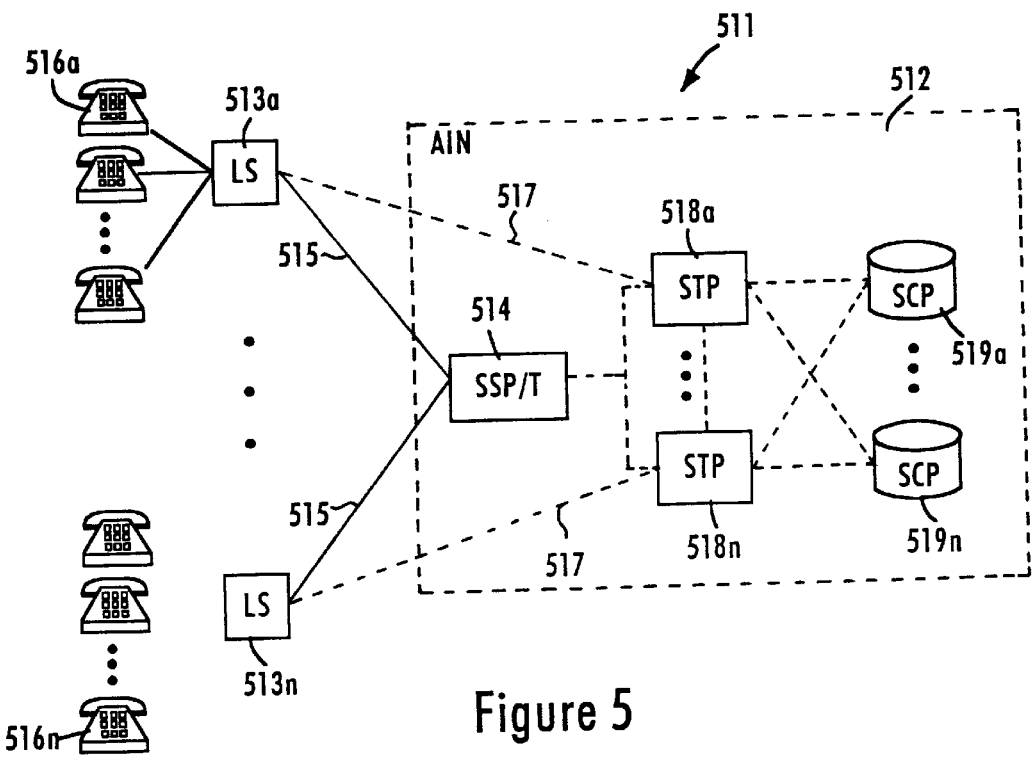
FIG. 5 is a simplified block diagram of a typical telecommunications system using common channel signaling in the form of an Advanced Intelligent Network (AIN) to provide enhanced subscriber services.

FIG. 5 is a simplified block diagram of a typical telecommunications system 511 using an Advanced Intelligent Network (AIN) 512 to provide enhanced subscriber services. The AIN 512 and its associated Signaling System Number 7 (SS7) protocol are described in the industry standard, "TR-NWT-000246, Bell Communications Research Specification of Signaling System Number 7," which is hereby incorporated by reference. A large number of Local Switches (LSs) or End Office Switches (EOs) 513*a–n*, which are not ISUP capable, may be connected to a Service Switching Point/Tandem (SSP/T) 514 via multi-frequency (MF) links 515. "Tandem", as used herein, may be a local, LATA, or access tandem. The LSs 513*a–n* provide connections for subscribers 516*a–n* into the telecommunications system or network 511. The AIN 512 uses a system of high speed telecommunications links known as a Common Channel Signaling (CCS) network which employs the standard SS7 signaling protocol to link all of the components of the AIN 512. Standard telephony diagrams, and all figures herein, indicate links utilizing the SS7 signaling protocol as dotted lines and MF trunks as solid lines.

The components of the AIN 512 may include the SSP/T 514, one or more Signal Transfer Points (STPs) 518*a–n* which act as intermediate switching nodes, and one or more Service Control Points (SCPs) 519*a–n*. The SCPs 519 each contain a database of enhanced subscriber services which are accessed and controlled by a Service Logic Program (SLP). The SCP 519 currently utilizes a standardized protocol known as Transaction Capabilities Application Part (TCAP) for coordination of functions. The current version of the protocol required for communication with the SCP 519 is TCAP/AIN Release 0.1. The SCP 519 is described in the Bellcore standard, "TA-NWT-001280, Advanced Intelligent Network (AIN) Service Control Point (SCP) Generic Requirements," which is hereby incorporated by reference. The SCP 519 acts as a repository for enhanced subscriber services which may be accessed by any one of the LSs 513*a–n*. In the past, each LS had to be individually upgraded with enhanced subscriber services. With the implementation of the AIN 512, and the required communications capabilities in the LSs, new enhanced services need only be added to the SCP 519.

Figure 8:
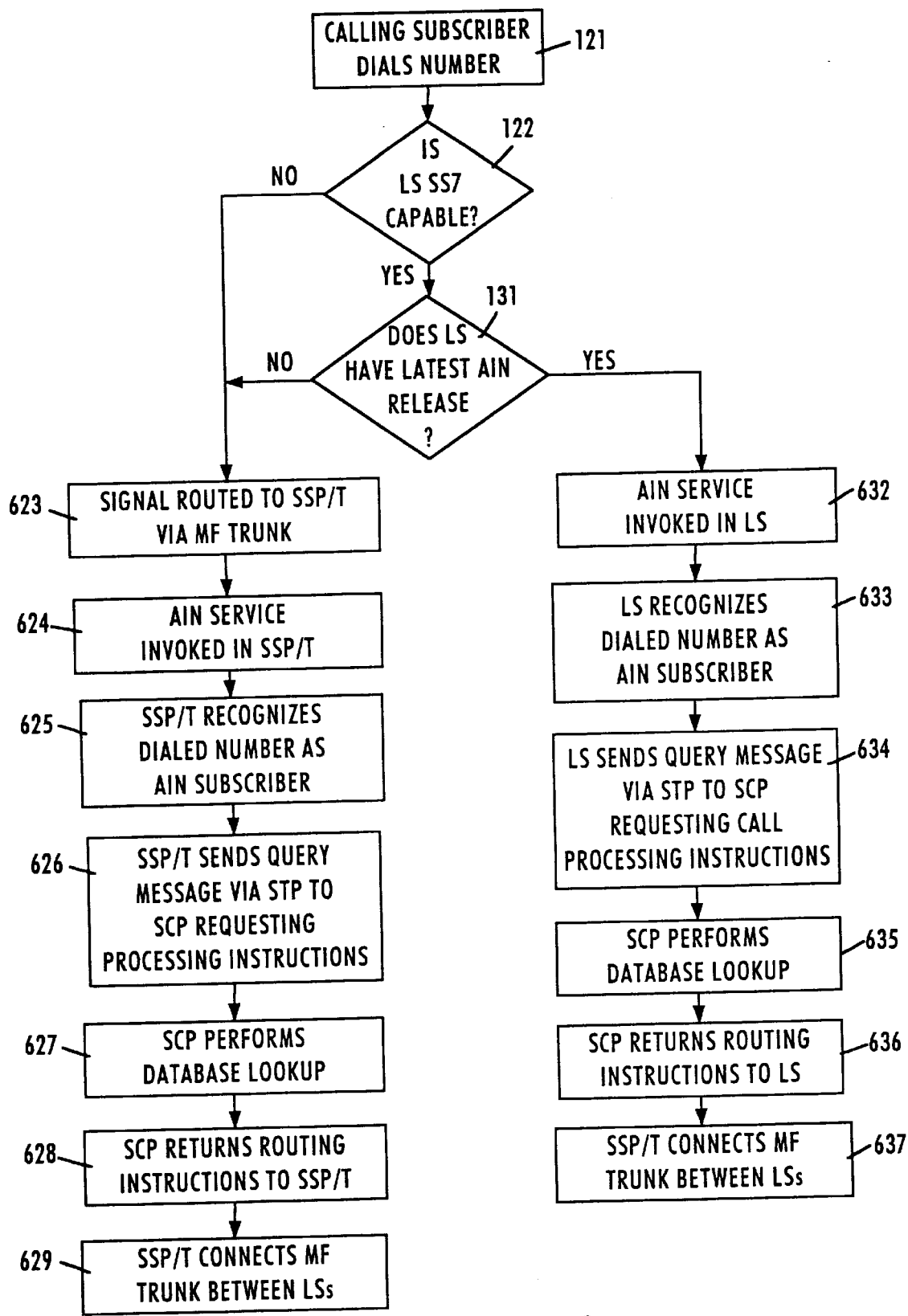
FIG. 8 is a flow chart illustrating the message flows involved in determining the type of access provided for different LSs or EOs, and in the method of service retrieval, from a database stored in a Service Control Point (SCP).

LSs 513 which have been upgraded to communicate utilizing the SS7 signaling protocol, and the latest release of the TCAP/AIN communications protocol, may communicate directly with an STP 518 and from there with an SCP 519 or other SSP/Ts, utilizing the high speed CCS network. LSs 513 which have not been upgraded with SS7 signaling capability, or with the TCAP/AIN communications protocol, must communicate over lower speed MF trunks 515 with the SSP/T 514 which, in turn, utilizes the SS7 signaling protocol, the TCAP/AIN communications protocol, and the CCS network to communicate with the STPs 518 and the SCPs 519. Dependence on MF trunks for access to the AIN 512 can substantially lengthen the time required to retrieve subscriber services, and ties up an expensive MF trunk which remains open and occupied during the retrieval period. The message flow utilized to retrieve an enhanced subscriber is described in more detail in conjunction with FIG. 8 below.

Another transaction often carried out utilizing the CCS network is call setup. Call-setup messages utilize a call-setup protocol known as the Integrated Services Digital Network (ISDN) User Part (ISUP) call-setup protocol. The ISUP call-setup protocol is described in the Bellcore standards, "TR-NWT-000317. Switching System Generic Requirements for Call Control Using the Integrated Services Digital Network User Part (ISDNUP)", "TR-NWT000394, Switching System Generic Requirements for Interexchange Carrier Interconnection Using the Integrated Services Digital Network User Part (ISDNUP)", and "TR-NWT000444, Switching System Requirements Supporting ISDN Access Using the ISDN User Part", which are hereby incorporated by reference.

Figure 6:
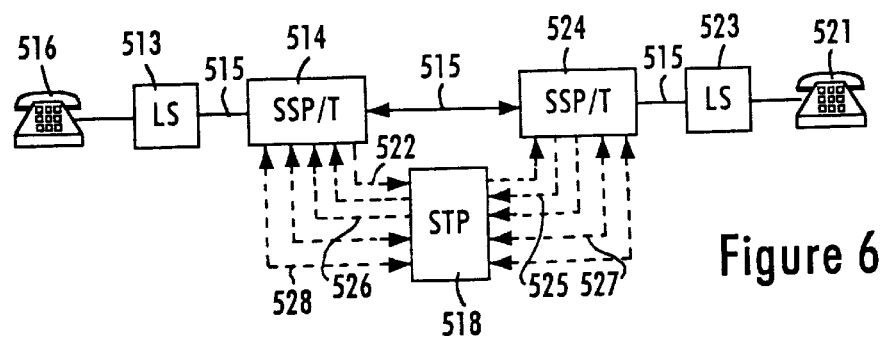
FIG. 6 is a simplified block diagram illustrating a typical message flow utilized for call setup between two local telephone switches (LSs) or end offices (EOs) which have not been upgraded to utilize the Integrated Services Digital Network User Part (ISUP) call-setup protocol, i.e., are not SSP capable.

FIG. 6 is a simplified block diagram illustrating a typical message flow utilized for call setup between two local telephone switches (LSs) 513 and 523 which have not been upgraded to utilize the ISUP call-setup protocol. Each non-ISUP LS is typically connected through a MF trunk 515 to an associated SSP/T. Thereafter, a series of ISUP messages is sent back and forth between an originating SSP/T 514, associated with a calling subscriber 516, and a destination SSP/T 524, associated with the called subscriber 521. The ISUP messages during call setup include an Initial Address Message (IAM) 522, an Address Complete Message (ACM) 525, an Answer Message (ANM) 526, a Release Message (REL) 527, and a Release Complete Message (RLC) 528. The ISUP messages are routed via the STP 518.

Figure 6A:
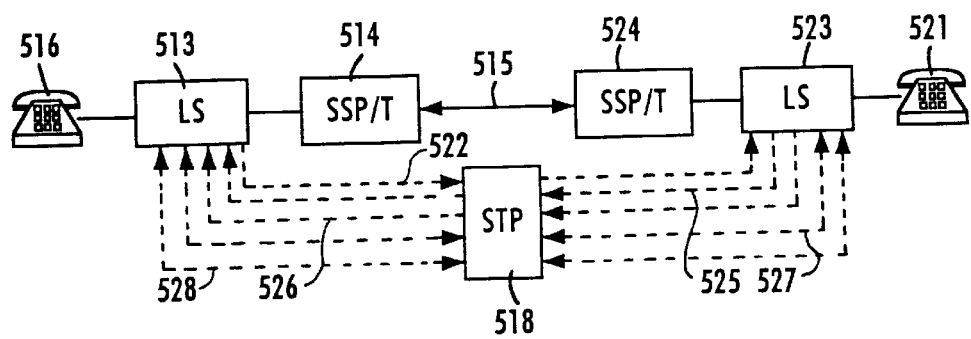
FIG. 6A is a simplified block diagram illustrating a typical message flow utilized for call setup between two LSs or EOs which have been upgraded to utilize the ISUP call-setup protocol and are SSP capable.

Many LSs in use today have been upgraded to utilize the ISUP call-setup protocol. FIG. 6a is a simplified block diagram illustrating a typical message flow utilized for call setup between two local telephone switches (LSs) 513 and 523 which have been upgraded to utilize the ISUP call-setup protocol. This upgrade allows ISUP-capable LSs to bypass the MF trunk link to the SSP/T, and communicate directly through the STP 518. Thus, the LS may perform call setup entirely over the CCS high speed telecommunications network. The CCS network is capable of transmitting at much higher data rates than multi-frequency (MF) trunks, and call setup can be completed over the CCS network much faster and more efficiently than in the past.

When utilizing the SS7 signaling protocol and the ISUP call-setup protocol for call setup, out-of-band signaling messages replace Multi-frequency (MF) and other in-band interoffice signaling mechanisms on selected circuits. The out-of-band messages are used to report circuit seizure and to transport address information, answer supervision, circuit release, etc. Thus, the network use of the SS7 signaling protocol for circuit-switched call connection and release differs fundamentally from traditional in-band circuit signaling. Instead of sending information on the facilities used for subscriber-to-subscriber communication, the switching system sends signaling information via a separate signaling network. The SS7 signaling protocol thereby allows switching systems to exchange information related to a circuit-switched connection even when the circuit is in the conversation mode.

Figure 7:
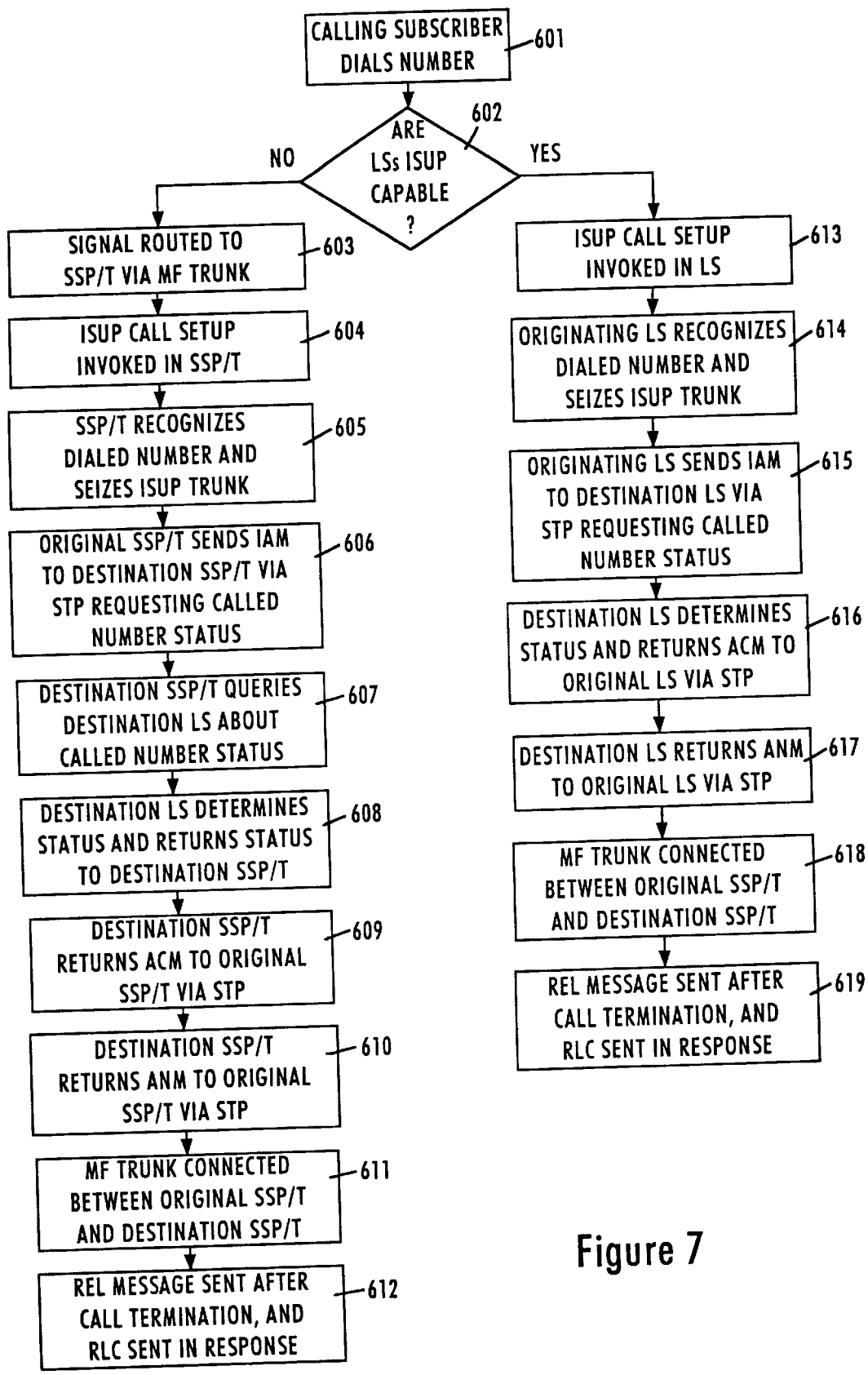
FIG. 7 is a flow chart illustrating the typical message flows involved in setting up a call via the ISUP call-setup protocol, for both non-ISUP and ISUP-capable LSs or EOs.

FIG. 7 is a flow chart illustrating the typical manner in which a call is set up via the ISUP call-setup protocol, for both non-ISUP LSs and ISUP-capable LSs. At step 601, a calling subscriber 516 (FIGS. 6 and 6a) dials the telephone number of a distant subscriber 521. At step 602, if the LSs are not ISUP-capable, the call is routed over MF trunks to an originating SSP/T 514 at step 603. At step 604, ISUP call setup is invoked in the SSP/T 514 which then recognizes the dialed number as a number which requires ISUP routing, and seizes an ISUP trunk at 605. At 606, the originating SSP/T 514 then utilizes the ISUP call-setup protocol to send an Initial Address Message (IAM) 522, via the STP 518, to a destination SSP/T 524, asking for the status of the dialed subscriber's phone 521. At step 607, the destination SSP/T 524 queries the destination LS 523 about the status of the called subscriber's phone 521. The destination LS 523 determines the status of the called subscriber's phone 521, i.e., busy, idle, forwarded, out of service, etc., at step 608, and returns this status to the destination SSP/T 524. At 609, the destination SSP/T 524 returns, via the STP 518, an Address Complete Message (ACM) 525 to the originating SSP/T 514, containing the status of the called subscriber's phone 521. The originating SSP/T 514 receives the ACM 525 and at step 610, the destination SSP/T 524 returns, via the STP 518, an Answer Message (ANM) 526 to the originating SSP/T 514 indicating that a MF trunk should be set up between the two SSP/Ts 514 and 524. At step 611, the MF trunk 515 between the originating SSP/T 514 and the destination SSP/T 524 is connected thereby providing speech capability between the calling subscriber 516 and the called subscriber 521. Once the call is terminated at step 612, a Release Message (REL) 527 is sent from the switch serving the first subscriber to hang up, to the switch serving the other subscriber. In response, a Release Complete Message (RLC) 528 is returned.

If, however, at step 602 it was determined that the LSs are ISUP-capable, then the message flow moves to step 613 where ISUP call setup is invoked in the originating LS 513. The originating LS 513 recognizes the dialed number as a number which requires ISUP routing and seizes an ISUP trunk at 614, and at 615 sends an IAM 522 to the destination LS 523 via the STP 518 requesting the status of the dialed subscriber's phone 521. At 616, the destination LS 523 determines the status of the dialed subscriber's phone and returns an ACM 525 to the originating LS 513 containing the status. At step 617, the originating LS 513 returns an ANM 526 indicating that a MF trunk should be set up between the two SSP/Ts 514 and 524. At step 618, the MF trunk 515 between the originating SSP/T 514 and the destination SSP/T 524 is connected thereby providing speech capability between the calling subscriber 516 and the called subscriber 521. Once the call is terminated at step 619, a REL 527 is sent from the switch serving the first subscriber to hang up, to the switch serving the other subscriber. In response, a Release Complete Message (RLC) 528 is returned.

Figure 7A:
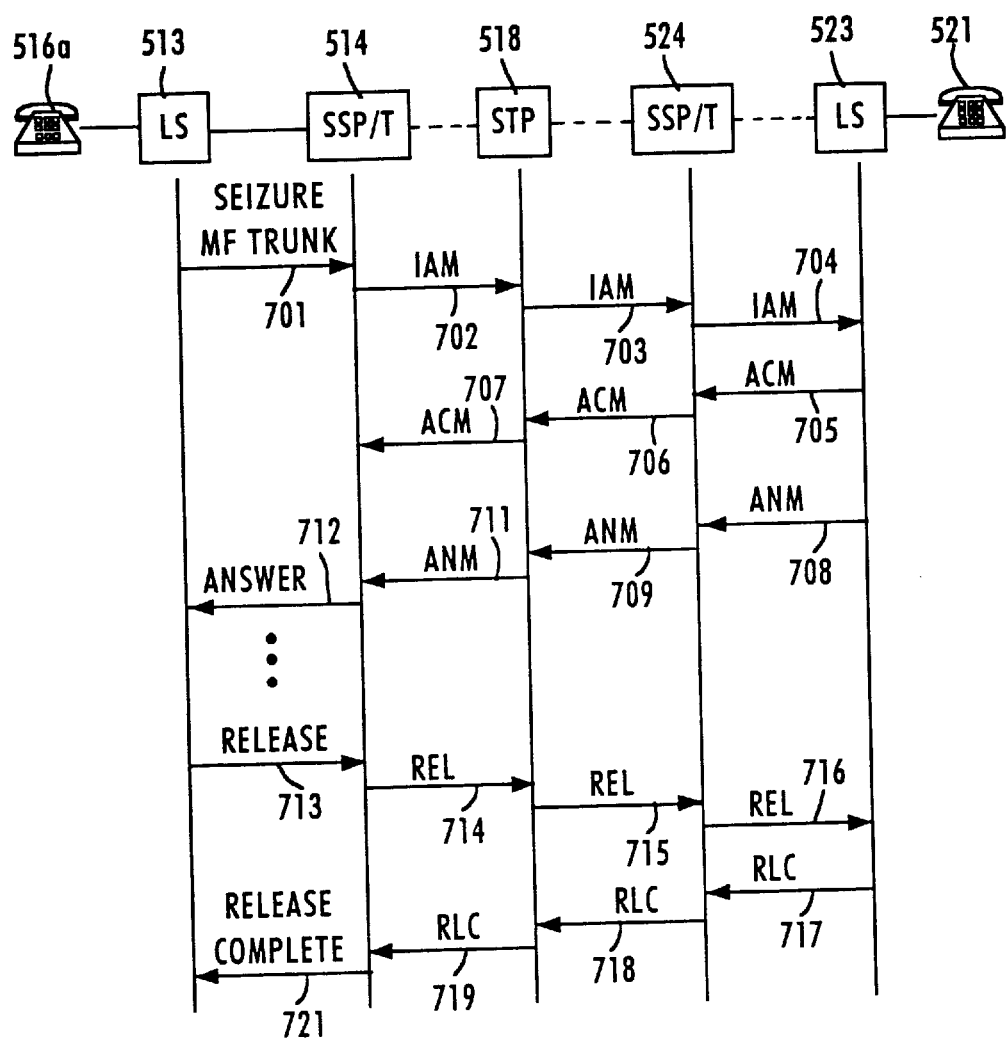
FIG. 7A is a message flow diagram illustrating the flow of messages from a non-ISUP LS to an ISUP-capable LS during call setup and call release.

FIG. 7a is a message flow diagram illustrating the flow of messages from a non-ISUP LS 513 to an ISUP-capable LS 523 during call setup and call release. At 701, the non-ISUP LS 513 seizes an MF trunk to the SSP/T 514. At 702, the SSP/T 514 sends an Initial Address Message (IAM) to the STP 518 which forwards it to the SSP/T 524 serving the called subscriber 521. At 704, the IAM is sent to the ISUP-capable LS 523 serving the called subscriber 521.

An Address Complete Message (ACM) is returned to the SSP/T 524 at 705. At 206, the ACM is sent to the STP 518 where it is forwarded to the SSP/T 514 at 707. An Answer message (ANM) is returned from the LS 523 to the SSP/T 524 at 708. At 709, the ANM is sent to the STP 518 where it is forwarded to the SSP/T 514 at 711. At 712, an answer signal is sent over the MF trunk to the non-I SUP LS 513.

Termination of the call is begun after the first subscriber hangs up (in this example, subscriber 516a). At 713, a release signal is sent over the MF trunk from the non-ISUP LS 513 to the SSP/T 514. A Release message (REL) is sent from the SSP/T 514 to the STP 518 at 714 which forwards the REL to the SSP/T 524 at 715. At 716, the REL is received by the LS 523 which returns a Release Complete Message (RLC) to the SSP/T 524 at 717. At 718, the SSP/T 524 sends the RLC to the STP which forwards the RLC to the SSP/T 514 at 719. At 721, a release complete signal over the MF trunk results in the disconnection of the call.

Referring again to FIG. 5, it can be seen that LSs 513a–n may access the AIN 512 either through MF trunks 515 and the SSP/T 514, or directly through SS7 links 517 to the STP 518. The message flow involved in determining the type of access, and in the method of service retrieval from the database in the SCPs 519, is shown in the flow diagram of FIG. 8. At step 621, a calling subscriber 516a (FIG. 5) dials the telephone number of a called subscriber 516n. At 622, it is determined whether or not the originating LS 513a has been upgraded to utilize the SS7 signaling protocol. If not, then the LS cannot directly access the AIN 512, and the signal is routed, at step 623, to the associated telephone Service Switching Point/Tandem (SSP/T) 514 via a low speed MF trunk 515. At step 624, AIN service is invoked in the SSP/T 514 which recognizes the dialed number as an AIN subscriber at 625. At step 126, the SSP/T 14 sends a Query message via the STP 518 to the SCP 519 requesting call processing instructions. The SCP performs a database lookup on the called subscriber's service that is being invoked at step 627, and then returns routing instructions to the SSP/T 514 at step 628. This response contains all of the information that is necessary to route the call (i.e., routing number, carrier, billing number, etc.). The SSP/T 514 receives the routing instructions from the SCP 519, and completes the call at step 629 by setting a MF trunk 515 between the calling subscriber 516a and the called subscriber 516n.

If, however, at step 622 it is determined that the LS is SS7-capable, then the message flow moves to step 631 where it is determined whether or not the LS has been upgraded with the latest release of the TCAP/AIN communications protocol. If not, then the flow again moves to step 623 where the signal is routed to the associated SSP/T 514 via MF trunk 515. Steps 624 through 629 are then utilized to retrieve the enhanced subscriber service.

If, at step 631, it is determined that the LS has been upgraded with the latest release of the TCAP/AIN communications protocol, then the LS may directly access the AIN 512. At step 632, AIN service is invoked in the LS which recognizes the dialed number as an AIN subscriber at 633. At step 634, the LS sends a Query message via the STP 518 to the SCP 519 requesting call processing instructions. The SCP performs a database lookup on the called subscriber's service that is being invoked at step 635, and then returns routing instructions to the LS 513 at step 636. This response contains all of the information that is necessary to route the call (i.e., routing number, carrier, billing number, etc.). The LS 513 receives the routing instructions from the SCP 519, and completes the call at step 637 by setting a MF trunk 515 between the calling subscriber 516a and the called subscriber 516n.

The preceding background discussion of the operation of the SS7 common channel signaling network paraphrases a discussion in U.S. Pat. No. 5,377,186. The contents of that patent are herein incorporated in their entirety by reference. A further description of the operation of the SS7 common channel signaling network is found in U.S. Pat. No. 5,247,571 which is incorporated herein by reference.

Figure 9:
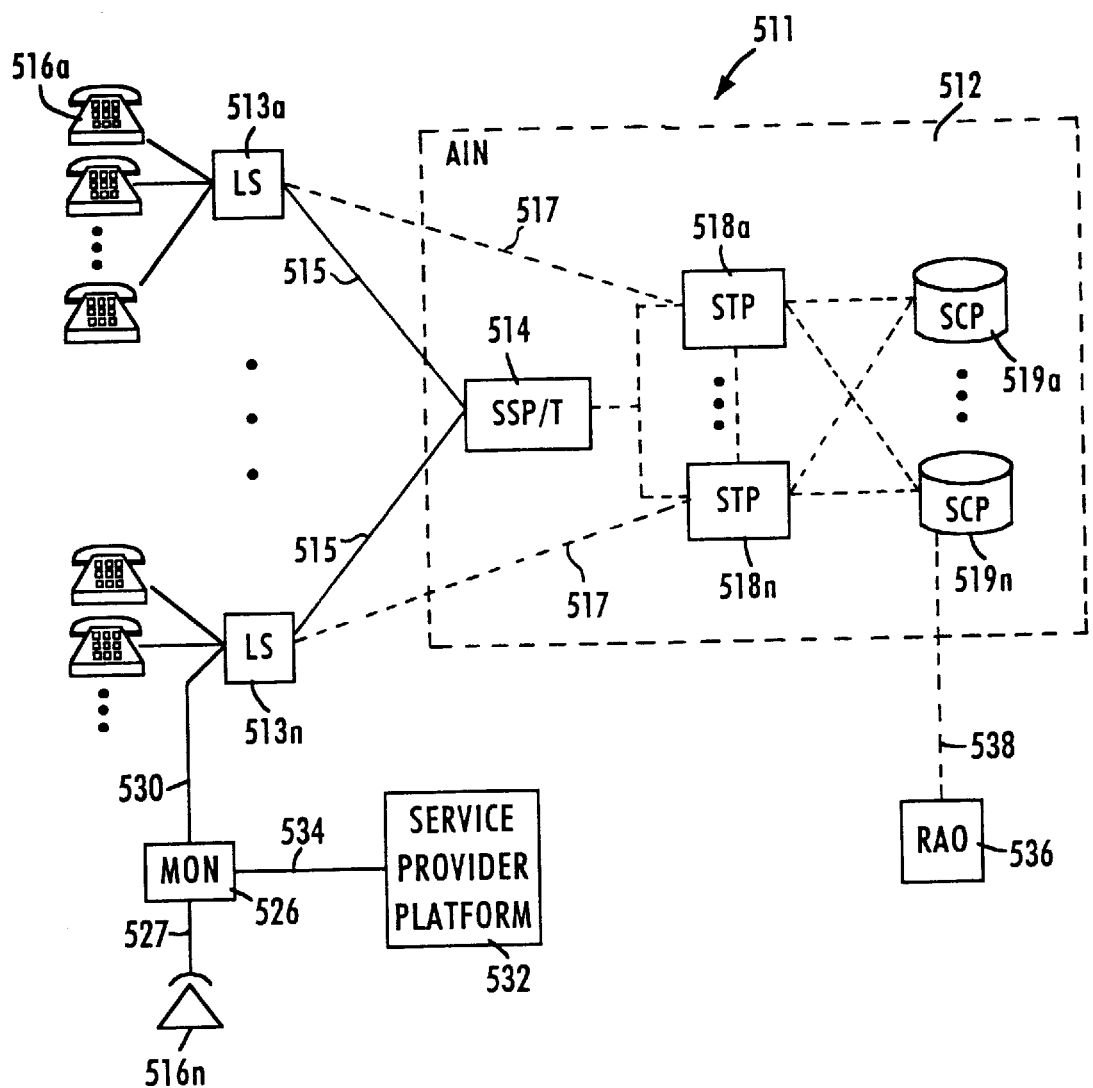
FIG. 9 is a simplified block diagram of another embodiment of the invention utilizing the capabilities of the common channel signaling system and an Advanced Intelligent Network (AIN) for information handling.

Referring to FIG. 9 there is shown another arrangement to provide leased access of local loops in a switched telecommunications network to third party providers including an arrangement for monitoring, measuring and billing for usage. In that figure there is shown at 511 a simplified block diagram of a typical communications system using an Advanced Intelligent Network (AIN) 512 of the type illustrated and described in connection with FIG. 5. Similarly reference numerals have been used to refer to similar parts in the two figures. In the embodiment of the invention illustrated in FIG. 9, there is shown a telephone terminal 516n connected to a monitor 526 via the terminal portion 527 of the local loop which originates at the Local Switch 513 in loop portion 530. The loop portion 530 is connected to the monitor 526.

The telephone terminal 516n is connected through the monitor 526 to an alternate service provider platform 532 via alternate service provider line 534. Through line 534, monitor 526 and leased local loop portion 527 the alternate service provider 532 may access and provide service to a customer terminal connected to the local loop portion 527. Such terminal may be any one or more types of devices, such as a telephone terminal, television, facsimile machine, computer or the like. Through such arrangement the alternate service provider accesses the customer premise at which the terminal 516n is located and pays for use of the local loop 527 on a usage basis as previously discussed. According to this embodiment of the invention a Service Control Point (SCP) 519n is utilized to perform the processor and storage functions of the monitor center or processor and storage 102 in the embodiment of the invention of FIG. 2, as will be described in further detail. The SCP 19n is connected to an accounting and billing center which is here illustrated as the Records Accounting Office (RAO) 536 connected to the SCP by link 538.

Figure 10:
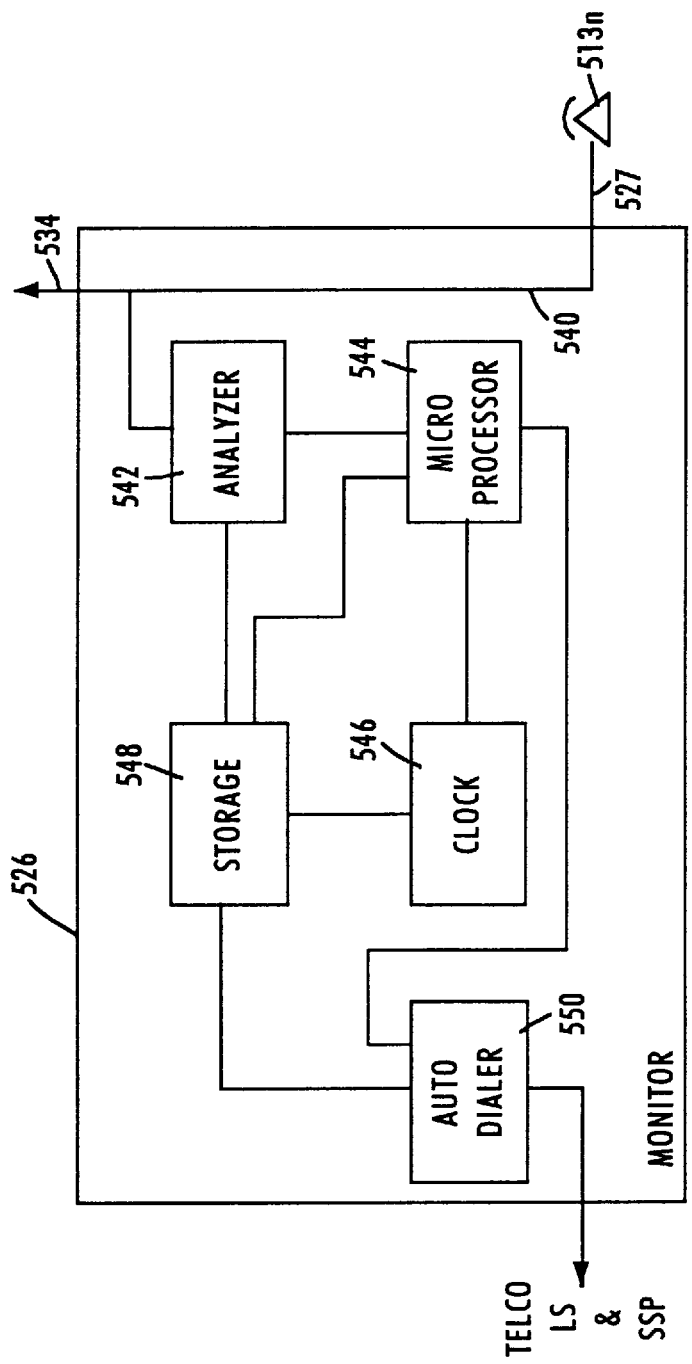
FIG. 10 is a simplified block diagram of a monitor for use with the embodiment of the invention shown in FIG. 9.

A monitor suitable for utilization in this embodiment of the invention is shown in block diagram in FIG. 10. Referring to that figure the monitor 526 is connected to the illustrative telephone terminal 513n by the terminal portion 527 of the local loop. This terminal portion of the local loop is connected within the monitor to the line 534 to the service provider platform 532 in FIG. 9. Within the monitor 526 the terminal local loop portion 527 is connected to the service provider line 534 by internal connecting link 540. Tapped onto this link 540 is the analyzer 542. While this connection is shown as a bridging connection it will be understood that the analyzer could be wired in series with the line or inductively or otherwise coupled thereto.

The analyzer receives and analyzes signaling, voltage levels, and the provided service signals on the link between the service provider platform and the particular terminal which may be connected to the local loop in the customer premise. The monitor is provided with a microprocessor 544, clock 546, storage 548 and auto dialer 550. The auto dialer delivers an output to the telephone network Local Switch (LS) and thence to the connected Signal Switching Point (SSP), which is shown in FIG. 9 as an SSP tandem (SSP/T) 514. The monitor 526 tracks the usage of the local loop between the premise and the alternate service provider for all usage whether or not that usage is initiated by the customer from the customer premise or is initiated by the service provider.

The operation of the embodiment of the invention illustrated in FIGS. 9 and 10 is as follows:

Assuming a loop usage initiated by the customer through the use of the telephone terminal 513*n*, the customer goes off-hook and dials a directory number which is here assumed to be a 10-digit directory number. While directory numbers of other lengths may be utilized, the digits of the dialed number are used for conveying signaling information both to the lessee service provider as well as to the monitor and lessor telephone company. Thus, the number of dialed digits may be determined as a contractual matter between the telephone company and the alternate service provider. The dialed digits may and usually do have significance to the alternate service provider in that the nature of the ordered service may be signaled through this medium.

In one embodiment the alternate service provider may provide alternate telephone service so that the dialed digits identify the called party. On the other hand, the service provider may also provide wide band television service and the customer may identify the desired channel or movie by dialing program or movie identification codes published by the service provider in a known manner. Such codes may also be provided to the lessor telephone company. In the case where the nature of the program signal is identified by dialed digits which are supplied to the lessor telephone company it is unnecessary that the analyzer 542 provide signal analysis of the type described previously in connection with the preceding embodiments of the invention.

When the customer at the terminal 513*n* goes off-hook the DC voltage level on the local loop and monitor line 540 changes from approximately 48 volts to a much lower value. The dialing of digits by the customer results in ringback signals followed by silence when the called party goes off-hook. This is further followed by audio or other signals from the called party. The aforementioned DC voltage changes and this signaling sequence is detected by the monitor and used as a commence connection signal. The commence connection signal is utilized to provide a commence timing signal for computing the duration of loop usage. The analyzer 542, microprocessor 544, and clock 546 are programmed to initiate the following steps.

The digits dialed by the customer are stored in the storage 548. Upon the occurrence of the commence timing signal the microprocessor 544 signals the autodialer 550. The autodialer then speed-dials the digits which had been previously stored in the storage 548. These digits signify the nature of the service provider signal which is to commence traversing the leased local loop. The dialed digits from the autodialer 550 are fed through the Local Switch 513*n* to the SSP 514. Upon receiving the digits the SSP is triggered to formulate and transmit a TCAP message to the SCP 519*n*. The TCAP message contains all of the information in the dialed digits in addition to the time that the TCAP message was dispatched. This data is stored in the SCP 519*n* as an indication that usage of the local loop 527 for an identified type of signal has commenced at an identified time. The identity of the local loop may be established by Automatic Number Identification (ANI) of the autodialer and/or of the monitor coupled to the loop.

At the time that the monitor detects the commence connection condition and starts the autodialing, the analyzer and microprocessor are set or placed in condition to detect silencing of the transmitted provider signal and/or a change in the DC voltage on the monitored loop. The latter indicates that the customer terminal went on-hook. When this occurs the autodialer is triggered to speed-dial a second number to the Local Switch and SSP. This number may be, for example, the same number as was dialed for commencement but with one changed digit. This in turn triggers the formulation and transmittal of a TCAP message to the SCP indicating a termination of the usage and the time thereof. The SCP periodically downloads its loop usage information to the Revenue Accounting Office which attends to the preparation and forwarding of suitable bills to the customer and/or service provider.

In the situation where the loop usage is initiated by the alternate service provider, the monitor and customer terminal will receive over the local loop a ringing signal. Along with the ringing signal there is also sent a data signal between rings in a known manner. This data signal identifies the calling service provider, if there are more than one, and identifies the nature of the signal to follow. The manner of signal identification and of signaling content in general is arranged through the lease agreement. The data arriving with the ring signal is temporarily stored in the analyzer or storage. When the customer terminal goes off-hook the analyzer detects the DC voltage change and the cessation of ringing and the accompanying data signal. This is followed by momentary silence and a signal of a different nature. This sequence constitutes the commence connection signal.

The commence connection signal causes the autodialer to speed-dial digits which convey information regarding the commencement and nature of signal to the SSP in the dialed digits. The SSP in turn formulates and transmits a TCAP message to the SCP. This TCAP message indicates the commencement of loop usage and the nature of the signal and the SCP stores this information. At the same time that the autodialer is triggered to speed-dial the digits the monitor is set to await and be triggered by the cessation of usage of the loop. This condition is signaled by cessation of the service signal detected in the analyzer followed shortly thereafter by the change in DC voltage on the loop. On the other hand these conditions may occur simultaneously when the customer terminates the loop usage by going on-hook. This causes the autodialer to speed-dial a second number to the Local Switch and SSP. The SSP reacts by formulating and transmitting a suitable TCAP message to the SCP to indicate termination of this usage and the time of such termination. As in the preceding case the number which is speed-dialed to indicate such termination of usage may be the same as the number dialed to indicate commencement with the change of a signal digit, by way of example.

Figure 11:
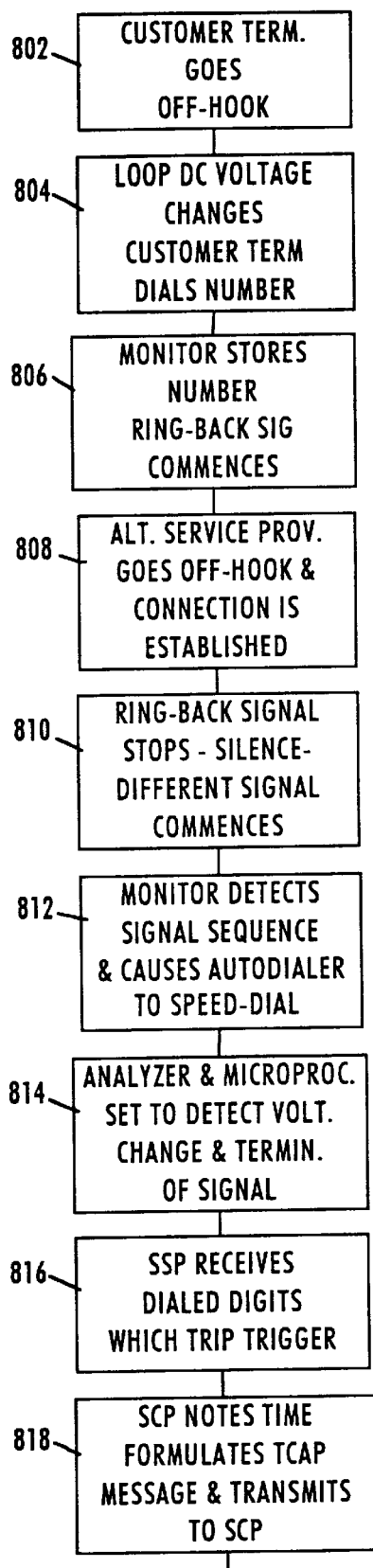
FIG. 11 is a simplified flow diagram illustrating the operation of the embodiment of the invention of FIGS. 9 and 10 where the usage of the local loop is originated from the customer premise end.
Figure 11:
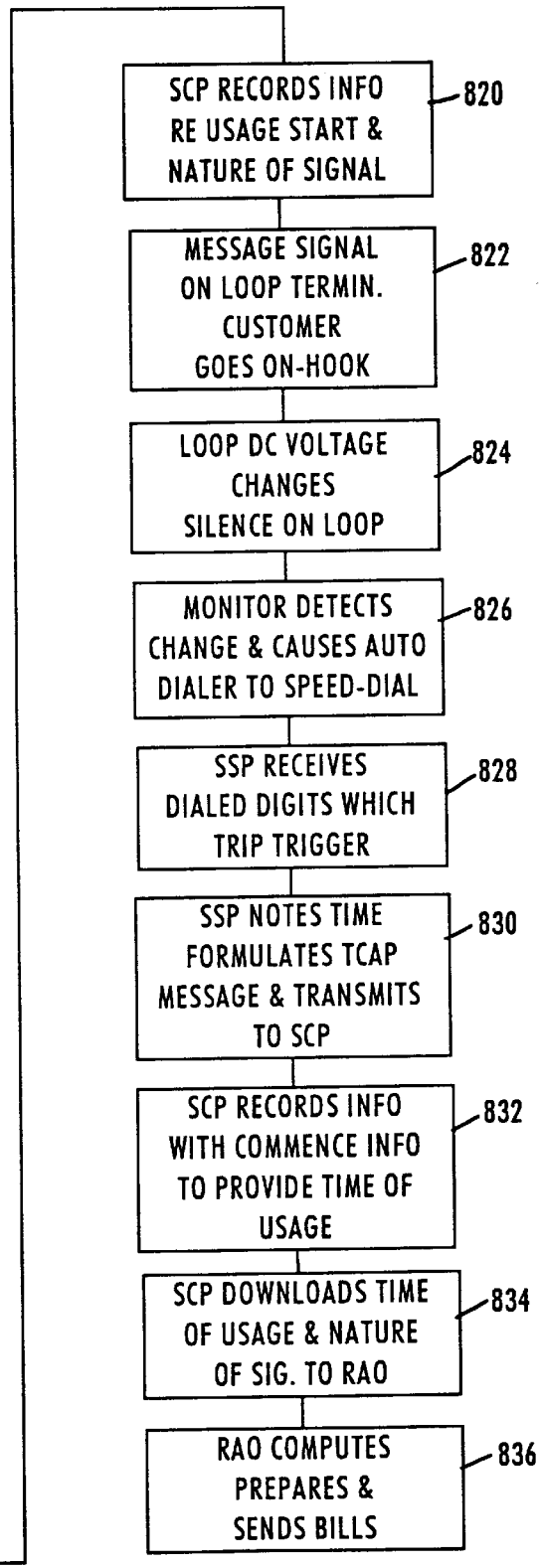
Figure 12:
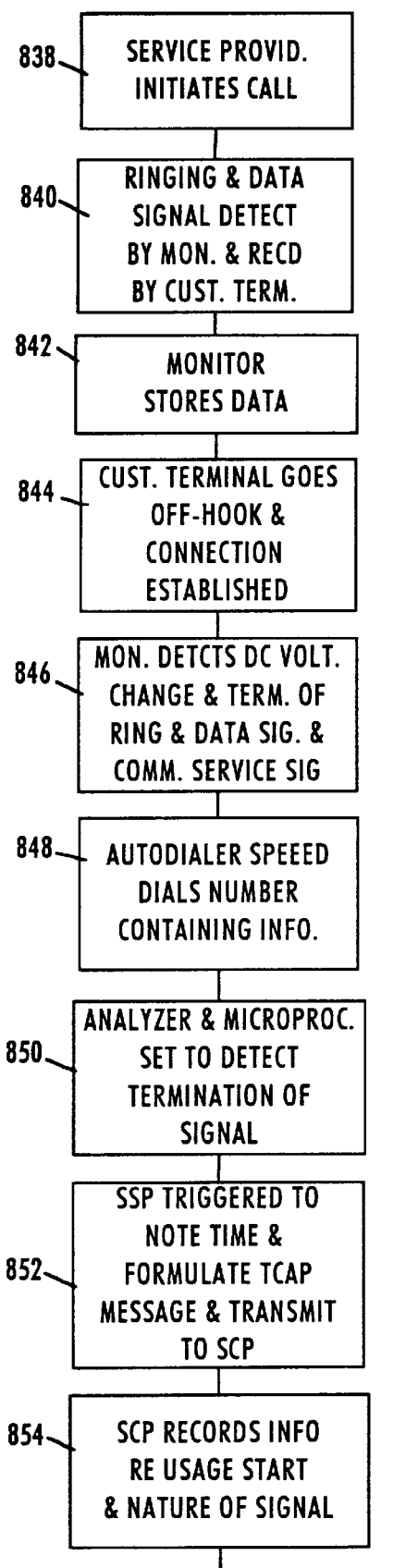
FIG. 12 is a simplified flow diagram illustrating the operation of the embodiment of the invention of FIGS. 9 and 10 in the situation wherein the loop usage is originated from the alternate service provider service platform.
Figure 12:
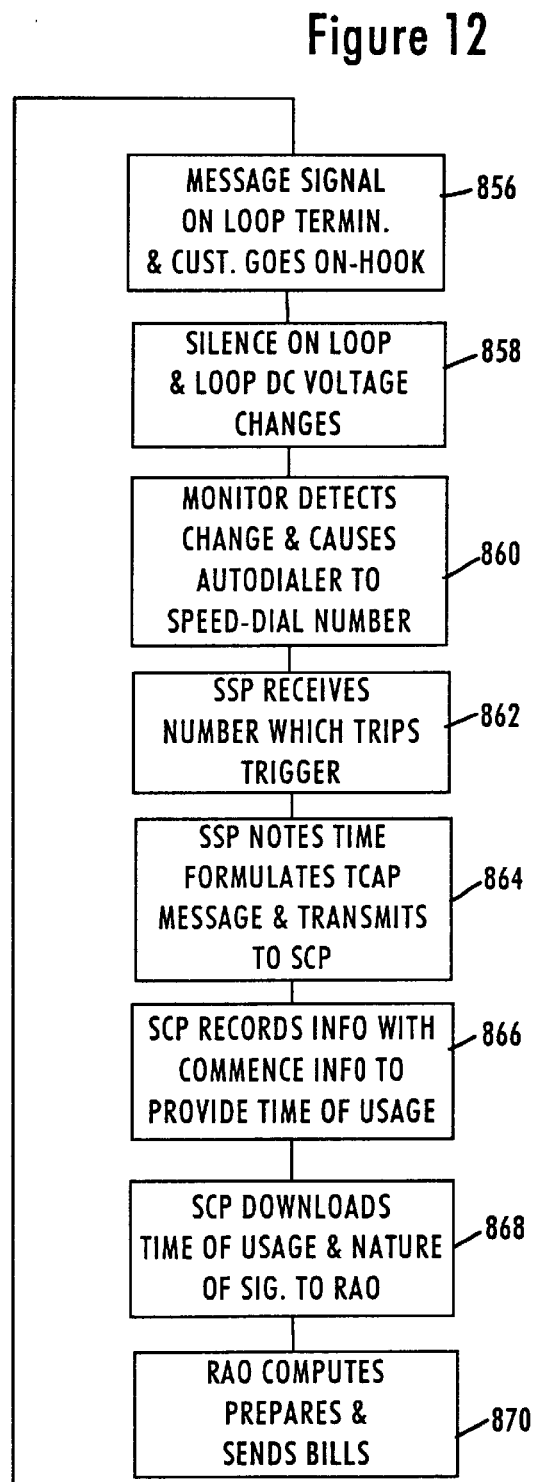

The operation is illustrated in flow chart form in FIGS. 11 and 12. Referring to FIG. 11, in the situation where the customer terminal originates the loop usage, the customer terminal goes off-hook at 802. At 804 the DC loop voltage changes as a result of the off-hook condition and the customer terminal dials a number. The monitor stores the dialed number at 806 and a conventional ring-back signal from the service provider service platform commences. At 808 the alternate service provider platform goes off-hook and connection is established. At this time the ring-back signal ceases. This is followed by silence and then commencement of the service providers message or service signal, as shown at 810. At 812 the monitor detects the foregoing signal-silence-different signal sequence causes the autodialer to speed-dial the previously stored number. At the same time the analyzer and microprocessor in the monitor are set to detect a DC voltage change on the loop and a termination of the service signal as shown at 814.

At 816 the SSP receives the digits which were dialed at 812. The receipt of these digits trips the SSP trigger. At 818 the SSP notes and stores the time and formulates a TCAP message which includes information identifying the service provider, loop, monitor or customer, the nature of the signal and the time of commencement of loop usage. The SSP then transmits this TCAP message to the SCP. At 820 this information is received by the SCP which records the information.

Usage of the leased loop to carry the alternate provider signal is now in progress. At the termination of this usage the alternate provider service message will terminate and the customer terminal will go on hook. This condition is shown at 822. The change in DC voltage and silence on the loop is shown at 824. At 826 the monitor detects this change and causes the autodialer to speed-dial predetermined termination of usage digits. As previously pointed out, these may constitute the same digits which were dialed to indicate commencement of use, but with the change of one digit. At 828 the SSP receives the dialed digits which trip the trigger set for tripping on the receipt of such digits.

The SSP notes and stores the time and formulates a TCAP message and transmits the same to the SCP at 830. This message contains the identity of the alternate service provider, the loop, monitor or customer and time. At 832 the SCP records this information in association with the information previously recorded at the commencement of usage. From these two pieces of information the duration and nature of usage may be ascertained. At 834 the SCP downloads the time of usage and the nature of the signal to the record accounting office (RAO), along with the identification of the loop and alternate service provider. At 836 the RAO computes and prepares a suitable bill and forwards the bill to the alternate service provider and/or the customer, as arranged between the telephone company, alternate service provider and customer.

Referring to FIG. 12 there is shown the situation where the alternate service provider originates the loop usage. At 838 the service provider platform initiates a call. This results in a ringing signal on the loop. The ringing signal contains data between rings in a known manner. In this case the data identifies the service provider and the nature of the signal to be transmitted, and may also identify the loop, monitor and/or customer. This ringing plus data signal is detected by the monitor and received by the customer terminal as indicated at 840. The monitor stores the data at 842. Reacting to the ringing signal, the customer terminal goes off-hook at 844 and connection is established. At 846 the monitor detects a DC voltage change on the loop and also detects the sequential termination of the alternate service provider ring and data signal.

At 848 the monitor causes the autodialer to speed-dial a number whose digits contain the information from the data. At this time the analyzer and microprocessor are set to detect a termination of the service signal as indicated at 850. At 852 the SSP receives the dialed number and is triggered to note the time and formulate a TCAP message containing the information and transmit the same to the SCP. The SCP records the information regarding the start of usage and the nature of the signal as well as the identity of the service provider, loop, monitor and/or customer, as indicated at 854. The delivery of the service provider message over the loop is now in progress.

The delivery of the message signal is terminated at 856 whereupon the customer terminal goes on hook. There is now silence on the loop and the on hook condition causes the DC voltage on the loop to change as indicated at 858. At 860 the monitor detects the DC voltage change and the silence on the loop and causes the autodialer to speed-dial a number. This number may be the same as the original number with the change of one digit as heretofore described. At 862 the SSP receives the dialed number which trips the trigger. This causes the SSP to note the time and formulate a TCAP message which is then transmitted to the SCP as indicated at 864. At 866 the SCP records the information in association with the commencement of use information to provide data as to the time of usage and nature of the signal. The SCP then periodically downloads to the revenue accounting office the data regarding time of usage, nature of signal, and identity of service provider, loop, monitor and/or customer. This is indicated at 868. At 870 the RAO computes, prepares and sends appropriate bills to the alternate service provider and/or the customer. It will be understood that such billing need not occur on a per use basis but at regular time intervals such as on a monthly basis.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A communication system comprising a switched telephone network connected by program controlled switches (PCSs) controlled by a data switched common channel signaling (CCS) network having a central controller and storage, said communication system including at least one end office switch having access to communication with said CCS network and central controller, and lines for connecting said end office switch to customer premises, at least certain of said lines connected to customer premises being disconnected from said end office switch;

monitors connected to said disconnected lines connected to customer premises;

at least one service provider connected to said disconnected lines having associated monitors and connected to customer premises for providing signals over said lines to terminals at said customer premises;

said monitors including detectors for detecting the commencement and discontinuance of signals from said service provider on said lines;

said monitors being connected to said end office switch and having access to communication with said central controller via said data switched common channel signaling network;

said central controller and storage storing information regarding the times of commencement and discontinuance of service provider signals on said lines connected to said service provider.

2. A communication system according to claim 1 including a billing compiler accessing said stored information and preparing bills for usage of said monitored lines.

3. A communication system according to claim 1 wherein said central storage stores information regarding the nature of the monitored signals; and including a billing compiler accessing said stored information and preparing bills based on duration and nature of usage of said monitored lines.

4. A communication system according to claim 1 wherein said communication with said central controller is via a signal switching point and a signal transfer point in said data switched common channel signaling network.

5. A communication system according to claim 4 wherein said communication utilizes transaction capabilities application part (TCAP) protocol.

6. A communication system according to claim 4 wherein said central control point and storage comprises a service control point (SCP) for said network.

7. A communication system according to claim 6 wherein said service control point storage periodically downloads the stored information regarding the usage of said monitored line to a billing compiler for calculation of billing for said usage.

8. A communication system comprising a switched telephone network connected by trunked together switches controlled by a separate data switched network having a central controller and storage, said communication system including at least one end office switch having access to communication with said data switched network and central controller, and lines for connecting said end office switch to customer premises, at least certain of said lines connected to customer premises being disconnected from said end office switch;

monitors connected to said disconnected lines connected to customer premises;

at least one service provider connected to said disconnected lines having associated monitors and connected to customer premises for providing signals over said lines to terminals at said customer premises;

said monitors including detectors for detecting the commencement and discontinuance of signals from said service provider on said lines;

said monitors being connected to said end office switch and having access to communication with said central controller via said data switched network;

said central controller and storage storing information regarding the times of commencement and discontinuance of service provider signals on said lines connected to said service provider.

9. A communication system according to claim 8 wherein said monitors access communication with said central controller via a dial up connection to said telephone network.

10. A communication system according to claim 9 wherein the occurence of a dial up connection of said telephone network to a monitor results in the transmission of a data signal over said data network to said central control and storage.

11. A communication system according to claim 10 wherein said data signal is formulated and transmitted from a signal switching point connected to said data network.

12. A communication system according to claim 11 wherein said data signal is formulated and transmitted as result of the content of the dial up signal which resulted in said dial up connection.

13. A communication system according to claim 11 wherein said data signal is in transaction capabilities application part (TCAP) protocol.

14. In a communication system comprising a switched telephone network connected by program controlled switches (PCSs) controlled by a data switched common channel signaling (CCS) network having a central controller and storage, said communication system including at least one end office switch having access to communication with said CCS network and central controller, and lines for connecting said end office switch to customer premises, the method comprising:

a) disconnecting at least one of said lines from said end office switch and connecting said line to a service provider for said service provider to provide service signals on said line;

b) monitoring said line between said service provider and said customer premises;

c) detecting the commencement of service signals on said line between said service provider and said customer premises;

d) connecting a means used to conduct said monitoring to said telephone network at the commencement of said service signals;

e) storing in said central control and storage data indicative of the commencement of said signals and the identity of the line;

f) detecting the termination of said service signals on said line;

g) storing in said central control and storage data indicative of the termination of said signals and the identify of the line; and h) using said stored data to compile a bill for the usage of the line.

15. A method according to claim 14 including the step of connecting said monitor to said telephone network via a dial up connection.

16. A method according to claim 14 including the step of storing said commencement data and said termination data in said central control and storage by switched data signaling.

17. A method according to claim 16 including the step of transmitting said data signals from a signal switching point associated with an end office in said telephone network.

18. A method according to claim 17 including the step of transmitting said data signals from said signal switching point to at least one signal transfer point and thence to said central control point and storage.

19. A method according to claim 14 wherein said data indicative of the commencement of said service signals on said line is contained in a number dialed to establish said connection to said telephone network.

20. A method according to claim 19 wherein the information regarding commencment of said signals contained in said dialed number is transmitted to said central control and storage in transaction capabilities application part (TCAP) protocol.

21. In a communication system comprising a switched telephone network connected by trunked together switches controlled by a separate data switched network having a central controller and storage, said communication system including at least one end office switch having access to communication with said data switched network and central controller, and lines for connecting said end office switch to customer premises, at least certain of said lines connected to customer premises being disconnected from said end office switch, the method comprising;

a) connecting at least one of said disconnected lines to a service provider for said service provider to provide service signals on said line;

b) monitoring said line between said service provider and said customer premises;

c) detecting the commencement of service signals on said line between said service provider and said customer premises;

d) connecting a means used to conduct said monitoring to said telephone network at the commencement of said service signals;

e) storing in said central control and storage data indicative of the commencement of said signals and the identity of the line;

f) detecting the termination of said service signals on said line;

g) storing in said central control and storage data indicative of the termination of said signals and the identity of the line; and h) using said stored data to compile a bill for the usage of the line.

22. A method according to claim 21 including the step of connecting said monitor to said telephone network via a dial up connection.

23. A method according to claim 21 including the step of storing said commencement data and said termination data in said central control and storage by switched data signaling.

24. A method according to claim 23 including the step of transmitting said data signals from a signal switching point associated with an end office in said telephone network.

25. A method according to claim 24 including the step of transmitting said data signals from said signal switching point to at least one signal transfer point and thence to said central control point and storage.

26. A method according to claim 22 wherein said data indicative of the commencement of said service signals on said line is contained in a number dialed to establish said connection to said telephone network.

27. A method according to claim 26 wherein the information regarding commencment of said signals contained in said dialed number is transmitted to said central control and storage in transaction capabilities application part (TCAP) protocol.

* * * * *